US012614222B2

(12) United States Patent
Scheibelhut et al.

(10) Patent No.: US 12,614,222 B2
(45) Date of Patent: Apr. 28, 2026

(54) USING A TRAINED MODEL TO GENERATE ACTION RECOMMENDATIONS BY PREDICTING METRICS RELATED TO ITEMS ORDERED AT AN ONLINE SYSTEM

(71) Applicant: Maplebear Inc., San Francisco, CA (US)

(72) Inventors: Brent Scheibelhut, Toronto (CA); Naval Shah, Toronto (CA); Madeline Mesard, New York, NY (US); Charles Wesley, San Diego, CA (US); Darin Amos, Toronto (CA)

(73) Assignee: Maplebear Inc., San Francisco, CA (US)

( * ) Notice: Subject to any disclaimer, the term of this patent is extended or adjusted under 35 U.S.C. 154(b) by 3 days.

(21) Appl. No.: 18/614,459

(22) Filed: Mar. 22, 2024

(65) Prior Publication Data

US 2025/0299240 A1    Sep. 25, 2025

(51) Int. Cl.
    *G06Q 30/06*        (2023.01)
    *G06N 20/00*        (2019.01)
            (Continued)

(52) U.S. Cl.
    CPC ......... *G06Q 30/0631* (2013.01); *G06N 20/00* (2019.01); *G06Q 30/0223* (2013.01); *G06Q 30/0633* (2013.01)

(58) Field of Classification Search
    CPC ........... G06Q 30/0631; G06Q 30/0223; G06Q 30/0633; G06N 20/00
    See application file for complete search history.

(56) References Cited

U.S. PATENT DOCUMENTS 12,307,498 B2 *  5/2025  Rao Karikurve .. G06Q 30/0633
12,346,932 B2 *  7/2025  Sallas ............... G06F 16/24578
                (Continued)

OTHER PUBLICATIONS

Raluca Mogos Descotes, Veronique Pauwels-Delassus; The impact of consumer resistance to brand substitution on brand relationship. Journal of Consumer Marketing Jan. 12, 2015; 32 (1): 34-42. https://doi.org/10.1108/JCM-07-2014-1041 (Year: 2015).*

(Continued)

*Primary Examiner* — Waseem Ashraf
*Assistant Examiner* — Christopher C Busch
(74) *Attorney, Agent, or Firm* — Fenwick & West LLP

(57)        ABSTRACT

A trained model is used to generate action recommendations by predicting different metrics related to items ordered at an online system. The online system gathers replacement data related to replacement of an item either online or at a location of a retailer when a user uses a physical receptacle in communication with the online system. The online system applies a metric prediction model trained to predict, based on the replacement data, an irreplaceability score indicative of an item's irreplaceability feature and/or a brand stickiness score indicative of an item's brand stickiness feature. The online system applies an item replacement model trained to identify, based in part on the irreplaceability score and/or the brand stickiness score, a list of candidate replacement items. A device associated with the user displays a user interface with a replacement item from the list prompting the user to include the replacement item to a cart.

17 Claims, 6 Drawing Sheets

(51) Int. Cl.
    *G06Q 30/0207*     (2023.01)
    *G06Q 30/0601*     (2023.01)

(56)             References Cited

U.S. PATENT DOCUMENTS

| | | | |
|---|---|---|---|
| 2001/0014868 A1* | 8/2001 | Herz | G06Q 30/02 |
| | | | 705/26.1 |
| 2018/0197218 A1* | 7/2018 | Mallesan | G07G 1/0054 |
| 2024/0177211 A1* | 5/2024 | Balasubramanian | |
| | | | G06Q 30/0629 |

OTHER PUBLICATIONS

W. Alessa, F. Ahmed Alfarhan, F. K. Bugis, A. Abdulhadi Aldawood, S. A. Alhuwaidi and A. Abul Hussain, "Smart Shopping Cart With Machine Learning, Navigation, and Weighing Technologies," 2024 6th International Symposium on Advanced Electrical and Communication Technologies (ISAECT). (Year: 2024).*
T. W. Alessa, F. Ahmed Alfarhan, F. K. Bugis, A. Abdulhadi Aldawood, S. A. Alhuwaidi and A. Abul Hussain, "Smart Shopping Cart With Machine Learning, Navigation, and Weighing Technologies," 2024 6th International Symposium on Advanced Electrical and Communication Technologies (ISAECT). pp. 1-6. (Year: 2024).*

\* cited by examiner

Smart Shopping Cart
150

Dashboard
315

Cameras
305

Weight Sensors
310

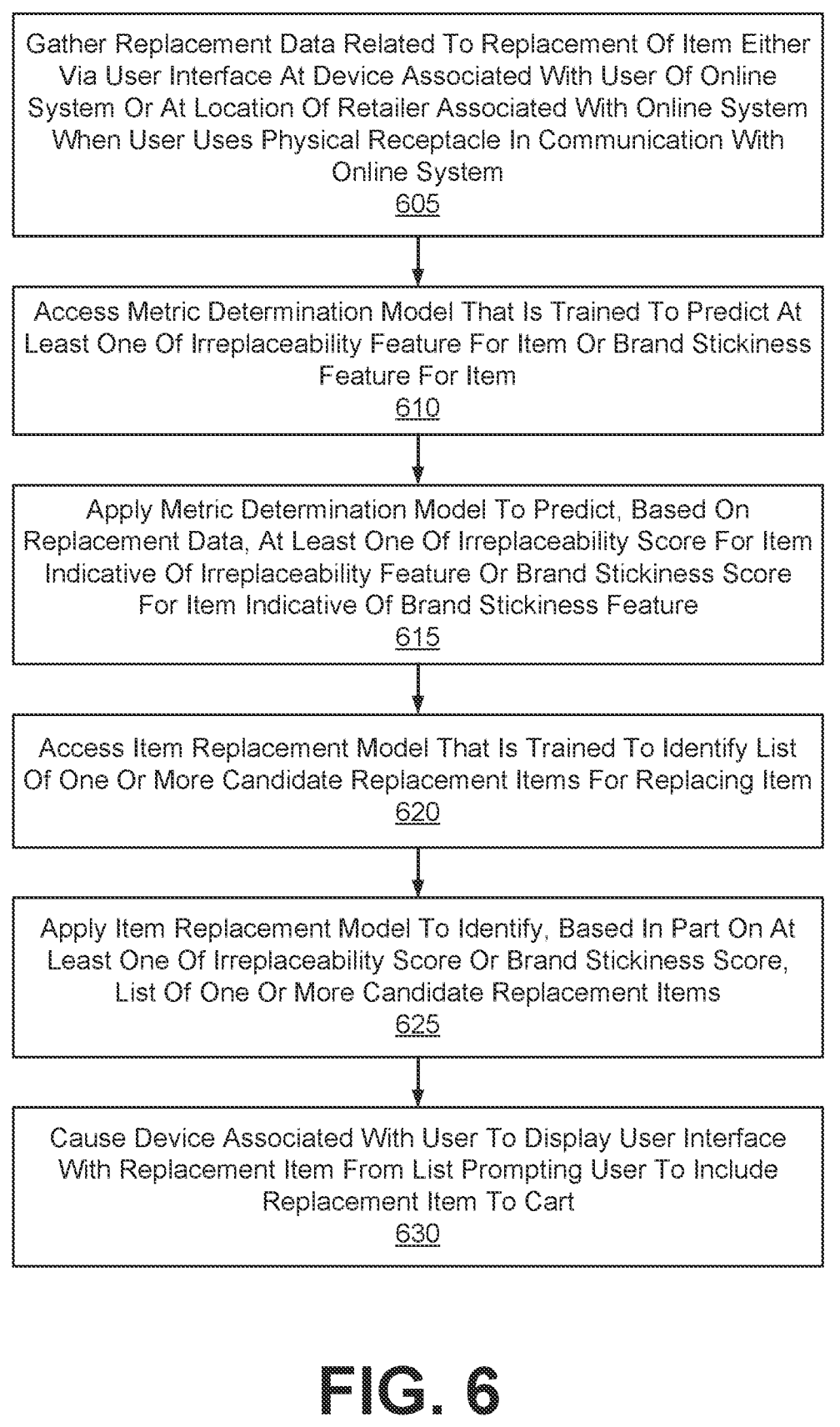

Gather Replacement Data Related To Replacement Of Item Either Via User Interface At Device Associated With User Of Online System Or At Location Of Retailer Associated With Online System When User Uses Physical Receptacle In Communication With Online System
605

Access Metric Determination Model That Is Trained To Predict At Least One Of Irreplaceability Feature For Item Or Brand Stickiness Feature For Item
610

Apply Metric Determination Model To Predict, Based On Replacement Data, At Least One Of Irreplaceability Score For Item Indicative Of Irreplaceability Feature Or Brand Stickiness Score For Item Indicative Of Brand Stickiness Feature
615

Access Item Replacement Model That Is Trained To Identify List Of One Or More Candidate Replacement Items For Replacing Item
620

Apply Item Replacement Model To Identify, Based In Part On At Least One Of Irreplaceability Score Or Brand Stickiness Score, List Of One Or More Candidate Replacement Items
625

Cause Device Associated With User To Display User Interface With Replacement Item From List Prompting User To Include Replacement Item To Cart
630

FIG. 6

USING A TRAINED MODEL TO GENERATE ACTION RECOMMENDATIONS BY PREDICTING METRICS RELATED TO ITEMS ORDERED AT AN ONLINE SYSTEM

BACKGROUND

An online system, such as an online concierge system, may offer various items for sale to users of the online system. Different items offered for sale are treated differently by the users, due to their differences in types, sizes, quantities, brands, etc. In order to predict a user's behavior in relation to an item offered for sale at the online system, it is desirable to accurately measure various metrics (i.e., features) of the item. However, it is not possible to determine, for each particular user, precise metrics that would accurately characterize each item using conventional means, such as manually observing a user's action in relation to that item. Hence, there is a technical problem of how to determine, at a large enough scale as required by the online system, metrics that would accurately characterize each item from the point of view of an individual user.

SUMMARY

Embodiments of the present disclosure are directed to using a trained model to generate action recommendations by predicting different metrics related to items ordered at an online system (e.g., online concierge system).

In accordance with one or more aspects of the disclosure, the online system gathers replacement data related to replacement of an item either via a user interface at a device associated with a user of an online system or at a location of a retailer associated with the online system when the user uses a physical receptacle in communication with the online system. The online system accesses a metric prediction model of the online system, wherein the metric prediction model is trained to predict at least one of an irreplaceability feature for the item or a brand stickiness feature for the item. The online system applies the metric prediction model to predict, based on the replacement data, at least one of an irreplaceability score for the item indicative of the irreplaceability feature or a brand stickiness score for the item indicative of the brand stickiness feature. The online system accesses an item replacement model of the online system, wherein the item replacement model is trained to identify a list of one or more candidate replacement items for replacing the item. The online system applies the item replacement model to identify, based in part on at least one of the irreplaceability score or the brand stickiness score, the list of one or more candidate replacement items. The online system causes the device associated with the user to display the user interface with a replacement item from the list prompting the user to include the replacement item to a cart.

BRIEF DESCRIPTION OF THE DRAWINGS

FIG. 6 is a flowchart for a method of using a trained model to generate action recommendations by predicting different metrics related to items ordered at an online concierge system, in accordance with one or more embodiments.

DETAILED DESCRIPTION

Figure 1:
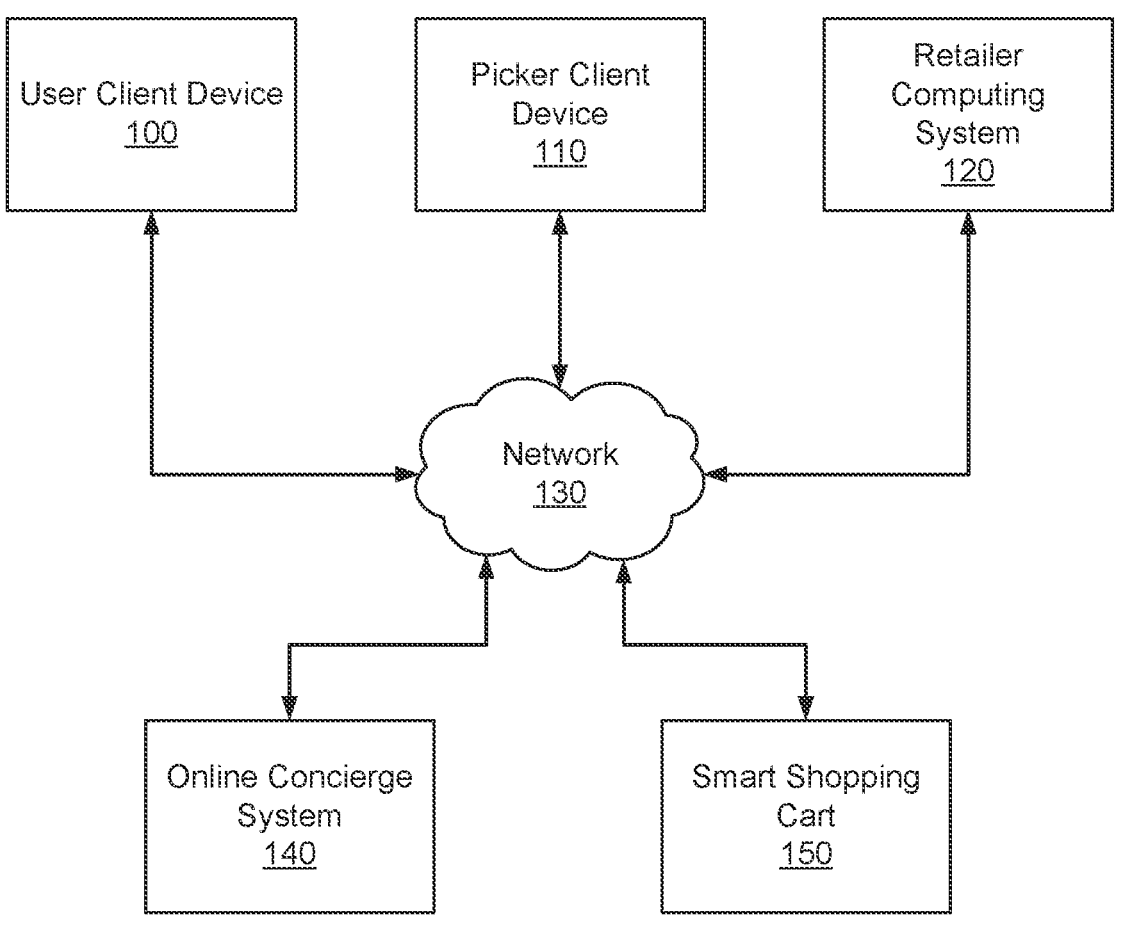
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, an online concierge system 140, and a smart shopping cart 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 may train a model (e.g., machine-learning model) to predict an item's "irreplaceability" metric and/or "brand stickiness" metric. The model may predict these metrics (or item features) based on users' previous decisions in relation to item replacements, which may be explicit item replacements when an ordered item is not found or implicit item replacements inferred from users' interactions with adding and removing items from their online carts or physical carts (e.g., the smart shopping carts 150). To train the model, the online concierge system 140 may utilize the explicit item replacements and the user's explicit feedback about items as ground truth. The online concierge system 140 may then apply the trained model to make decisions about action recommendations, such as replacement of items, catalog optimization, retailer insights, etc.

The irreplaceability of an item may be closely related to an item uniqueness. The item uniqueness may be characterized by a user always searching for a specific item and ending up on an item through a generic means. For example, if the user always searches for "Bananas" when buying "Brand A Bananas," then "Brand A" is a brand that does not carry much weight for this particular item, and it is different from brand stickiness. For example, if the user instead searches for "cookies with red fruit center" before selecting "Brand B fruit cookies," the "cookies with red fruit center" is not a specific brand item, but it is certainly not a generic item. This is an indication that the item does not have a strong brand correlation. If an item is generic, the generic feature of the item reduces the item's irreplaceability and increases the equivalency of the items that fall into the same generic category.

The brand stickiness represents a metric (or feature or statistic variable) indicative of how likely it is for a user to replace one brand for another brand. For example, if "Yogurt Brand A" is searched for often but still regularly replaced with "Yogurt Brand B," then the "Yogurt Brand A" features a brand stickiness metric that is less than that of, e.g., "Yogurt Brand C" that is searched for often but not regularly replaced with a different brand. Thus, "Yogurt Brand C" is a stickier brand than the "Yogurt Brand A." This may also feed into an item's irreplaceability and equivalency. In this sense, the brand stickiness may increase an item's irreplaceable value and decrease its equivalency to other items. While irreplaceability may be affected by the brand, the irreplaceability and the brand stickiness are not linearly intertwined. For example, just because an item has a high brand stickiness it does not guarantee that the item is also irreplaceable.

The online concierge system 140 presented herein has the ability to offer unique retailer insights based on underlying user replacement data and user searches for items to purchase. The underlying data may be integrated with a machine learning algorithm run by the trained model to output certain characteristics of items that retailers, the online concierge system 140, and/or consumer packaged goods (CPG) brands manufacturers could leverage. The two key characteristics identified by the trained model may be the irreplaceability metric and the brand stickiness metric for a particular item. However, the trained model may predict one or more additional metrics for the particular item. All these metrics can be predicted for an individual user or a group of users of the online concierge system 140. The online concierge system 140 is described in further detail below with regards to FIG. 2 and FIG. 4.

The smart shopping cart 150 is an in-store shopping cart that enables a user of the online concierge system 140 to physically add (i.e., place) items from a location of a retailer (e.g., store) into the smart shopping cart 150 and check the items out from the location of the retailer without an involvement of an employee of the retailer at the point of sale. The smart shopping cart 150 may be connected to the online concierge system 140 via the network 130. During the user's shopping session, the smart shopping cart 150 may utilize various sensors (e.g., one or more weight sensors, one or more cameras, etc.) to gather data about the user's activity, including, but not limited to, a location of the smart shopping cart 150 in the store, weight changes of the smart shopping cart 150 as items are added to or removed from the smart shopping cart 150, video of the user's activity in and around the smart shopping cart 150, etc. Data gathered by various sensors of the smart shopping cart 150 may be utilized by the trained model of the online concierge system 140 to predict an "irreplaceability" metric and/or "brand stickiness" metric for a specific item. In one or more embodiments, the smart shopping cart 150 is considered being a part of the online concierge system 140. It should be noted that the concepts described herein in relation to the smart shopping cart 150 can be extended and/or applied to other form factors, such as a handheld shopping basket, a handheld receptacle, or some other handheld object that can be used to receive and store shopping items. The smart shopping cart 150 is described in further detail below with regards to FIG. 3.

Figure 2:
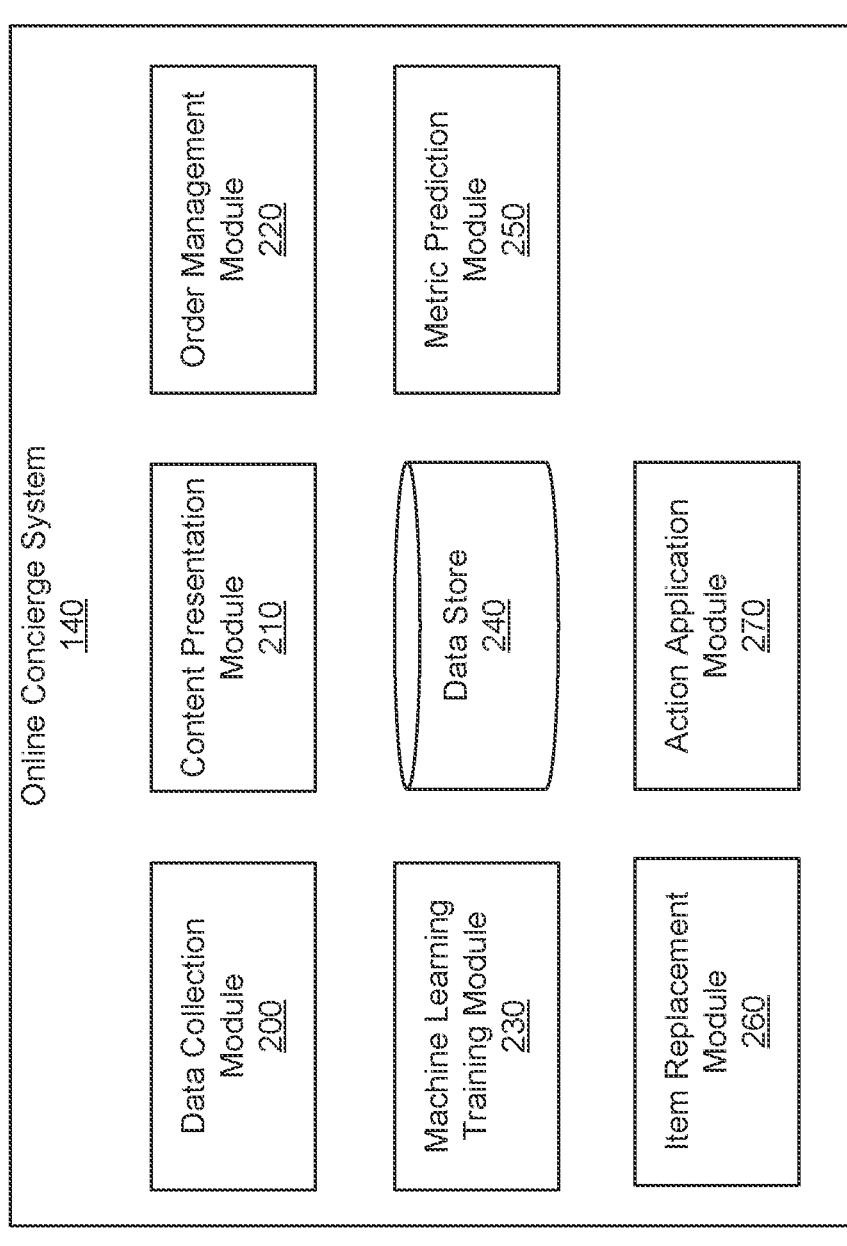
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, a metric prediction module 250, an item replacement module 260, and an action application module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The metric prediction module 250 may determine different metrics for an item ordered and/or converted at the online concierge system 140. The metric prediction module 250 may access a metric prediction model (e.g., machine-learning model) that is trained to predict an irreplaceability metric and/or a brand stickiness metric for an item. In one or more embodiments, the metric prediction model is trained to predict one or more additional metrics of the item. The metric prediction module 250 may deploy the metric prediction model to run a machine-learning algorithm to output, based on a set of inputs, an irreplaceability score indicative of the irreplaceability feature of the item and/or a brand stickiness score indicative of the brand stickiness feature of the item. A set of parameters for the metric prediction model may be stored at one or more non-transitory computer-readable media of the metric prediction module 250. Alternatively, the set of parameters for the metric prediction model may be stored at one or more non-transitory computer-readable media of the data store 240.

The metric prediction module 250 may provide the set of inputs representing various input features to the metric prediction model. In providing the set of inputs to the metric prediction model, the metric prediction module 250 may provide item replacement data including information about a replacement history for a specific item. The replacement history may include information about explicit item replacements and/or implicit item replacements for the specific item and for an individual user or a group of users of the online concierge system 140. Additionally, in providing the set of inputs to the metric prediction model, the metric prediction module 250 may provide user contextual data and/or retailer contextual data.

In one or more embodiments, information about explicit item replacements is collected when a user orders an item, the ordered item was not found (e.g., the ordered item is out-of-stock), and the user then selects a replacement item or cancels the ordered item. In such cases, a picker who fulfills an order placed by the user conducts a replacement for the user. And the user either has already selected the replacement or likes/dislikes or provides actionable information on the replacement (e.g., "this replacement was poor"). The information about explicit item replacements may be communicated as digital data from the user client device 100 via the network 130 to the metric prediction module 250.

Information about implicit item replacements may originate from different sources. In one or more embodiments, the information about implicit item replacements is related to a search query for an item entered by a user via a user interface of the user client device 100 that is followed by adding a different item of the same type into a user's cart. This action may represent an item swapping performed before an online order is placed or a cart is checked out. The action may occur for a variety of reasons, but ultimately the user was looking for an item X, and instead ends up trying to buy an item Y. For example, the user may search for a specific item but then adds to a cart another similar item from search query results (e.g., search for 32 oz Brand A Yogurt but added to the cart 32 oz Brand B Yogurt). Additional data may be gathered when a user is searching for a specific brand rather than a generic item and then adds an item of the searched brand to a cart. In such cases, the gathered data may indicate a high level of "brand stickiness" Additionally or alternatively, generic items may be identified where a brand value does not necessarily matter-specifically which items are typically searched for by brand compared to the generic item itself. For example, most users do not search for a specific brand of bananas but do search for a specific brand of ice cream. Data with information about a search query and addition of an item into a user's cart based on results of the search query may be communicated as digital data from the user client device 100 via the network 130 to the metric prediction module 250.

In one or more other embodiments, an in-store user that utilizes an in-store list functionality at a user interface of the user client device 100 has a certain item on their in-store list (e.g., "Brand A BBQ chips"). However, when the user shops, they actually added an item of the same type but of a different brand (e.g., "Brand B BBQ chips") to the in-store list. This type of data with information about implicit item replacements may be captured as the user is at a location of a retailer and using the in-store list functionality of the user client device 100. The captured data may be communicated from the user client device 100 via the network 130 to the metric prediction module 250.

In one or more other embodiments, cameras, computer vision and/or other sensors of the smart shopping cart 150 may detect that a user shopping at a location of a retailer put an item in the smart shopping cart 150 and then swapped the originally selected item for a different item of the same type and same or similar quantity. The replacement item being of the same type and same or similar quantity as the originally selected item is preferred since the more different the replacement item is to the original item the less useful this signal is for determining uniqueness, replaceability, and/or brand stickiness. In one or more other embodiments, various sensors of the smart shopping cart 150 can also detect that a user put a different item in the smart shopping cart 150 when one of the items near the user is out-of-stock. Implicit replacement data collected using various sensors of the smart shopping cart 150 may be communicated via the network 130 to the metric prediction module 250.

Figure 3:
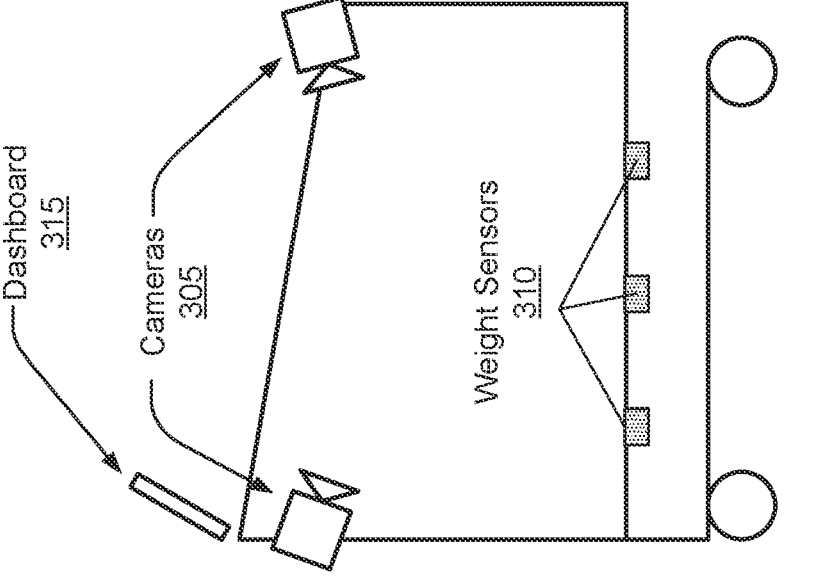
FIG. 3 illustrates an example smart shopping cart associated with an online concierge system, in accordance with one or more embodiments.

FIG. 3 illustrates an example smart shopping cart 150 associated with the online concierge system 140, in accordance with one or more embodiments. The smart shopping cart 150 may have one or more cameras 305 that collect video data and/or image data in relation to items placed in the smart shopping cart 150, such as a weight of each item as indicated in an item label, a brand of each item, a price of each item, etc. Alternatively or additionally, the one or more cameras 305 may collect video data and/or image data in relation to actions in and around the smart shopping cart 150, such as a location of the smart shopping cart 150 in the store when a certain action occurs (e.g., when an item is added to the cart), user's gestures when placing items in the smart shopping cart 150, video and/or images of user's interactions with the smart shopping cart 150, track the location of the user within the store, etc. Alternatively or additionally, the smart shopping cart 150 may be equipped with one or more weight sensors 310 that measure weights of items placed in the smart shopping cart 150. Hence, the cameras 305 and/or weight sensors 310 can gather data including information about implicit item replacements conducted by the user while shopping at a location of a retailer associated with the online concierge system 140. The smart shopping cart 150 may further include a dashboard 315 that operates as a user interface that displays a list of items added to a receptacle of the smart shopping cart 150 and can be used for the checkout. The smart shopping cart 150 may include additional sensors not shown in FIG. 3. Data gathered by various sensors of the smart shopping cart 150 may be uploaded via the network 130 to the metric prediction module 250.

In one or more embodiments, when users shop online, they often hit out-of-stock items and then may add a new item as a manual replacement. This also represents another signal about implicit item replacements that occur before the order is placed. If the user does not replace the out-of-stock item, this information can be leveraged by ranking the out-of-stock item higher on an "irreplaceable" score. Data with information on whether the manual replacement occurs or not and what type of manual replacement is performed can be communicated to the metric prediction module 250 from the user client device 100 via the network 130 and input into the metric prediction model. The irreplaceable score of the item may be utilized to rank those irreplaceable items higher on our replacements page when the user is checking out. An output of the metric prediction model can be used to identify items and their replacements, but also to identify irreplaceable/anchor items to keep in stock at all times.

Note that the type of manual replacement is also important, i.e., information on how "close" the new item is to the replaced item. If the new item is the exact same item but of a different size/quantity, then this item may yet be an "irreplaceable" type of item. If the new item is of the same brand but a different flavor, then the brand may still be very important. If the new product is of a different brand and different item altogether, it can be concluded with some confidence that the replaced item is highly replaceable for this user. There may be cases where the user does or does not elect to replace an out-of-stock item with a new item based on what is available in stock. For example, if the user replaces out-of-stock item when the same item in a different size and quantity is available, but does not replace under other circumstances, the out-of-stock item can be marked high on the irreplaceable score.

As aforementioned, the metric prediction module 250 may provide retailer contextual data and/or user contextual data as additional input features to the metric prediction model. In providing the retailer contextual data to the metric prediction model, the metric prediction module 250 may provide data with information about a name of a retailer and/or location of the retailer. Furthermore, in providing the user contextual data to the metric prediction model, the metric prediction module 250 may provide data with information about a cohort where this user belongs to. The metric prediction model may operate on a per-retailer basis and per-location basis. For example, a brand stickiness for an item may vary by the retailer and location of the retailer's store, mostly because the types of users also vary.

It should be noted that one item may be a good replacement for another item simply by being an identical substitute except for the quantity. For example, in the case of a 6-pack and 12-pack of the exact same beverage, it could be that the 6-pack is a perfect replacement for the 12-pack, but it could also be that it is not. Some users would switch from a 6-pack Brand A soda to a 6-pack Brand B soda if the 6-pack Brand A soda is not available instead of switching to a 12-pack Brand A soda. That would both be an indicator for the metric prediction model that the brand stickiness is not as strong and also that the user may be price sensitive or simply that they do not have house storage for a 12-pack soda. The latter would only play into the irreplaceability score if many users (e.g., predetermined percentage of users) opted not to upgrade to the 12-pack Brand A soda. This may be common in dense urban areas where there is not a lot of storage space, and most users truly only want a 6 pack on their trip to the store. The retailer may continue to stock both 6-pack and 12-pack sodas despite the information because selling the 12-pack soda as a separate item allows them to provide a price incentive for users to buy more at once and sell more in aggregate.

The item replacement module 260 may identify one or more items for replacement of an originally requested missing item based in part on one or more metrics for the missing item output by the metric prediction model. The item replacement module 260 may access an item replacement model that is trained to identify a list of one or more replacement items for recommendation to a user of the online concierge system 140 for replacing a missing item. The item replacement module 260 may deploy the item replacement model to run a machine-learning algorithm to output, based in part on one or more metrics for the missing item as well as user data (e.g., user's replacement history as available at the data store 240), the list of one or more replacement items. A set of parameters for the item replacement model may be stored at one or more non-transitory computer-readable media of the item replacement module 260. Alternatively, the set of parameters for the item replacement model may be stored at one or more non-transitory computer-readable media of the data store 240.

The one or more metrics for the missing item input into the item replacement model may include an irreplaceability score indicative of the irreplaceability feature of the missing item and/or a brand stickiness score indicative of the brand stickiness feature of the missing item. The irreplaceability score and the brand stickiness score may be output by the metric prediction model. By providing these additional input features to the item replacement model, the machine-learning replacement algorithm run by the item replacement model may be improved. In one or more embodiments, the item replacement module 260 applies a threshold to the irreplaceability score and/or the brand stickiness score to decide whether to initiate a replacement flow, i.e., whether to deploy the item replacement model. For example, if the missing item has a high brand stickiness score, then candidate replacement items identified by the item replacement model should be of the same brand. But, if the missing item has a high irreplaceability score, then the item replacement module 260 may not deploy the item replacement model, i.e., the replacement flow may not be run at all.

The action application module 270 may trigger one or more actions based on one or more metrics (e.g., an irreplaceability score and/or brand stickiness score) for an item as output by the metric prediction model. As high values of irreplaceability scores across users identify irreplaceable items, the action application module 270 may send, via the network 130, a notification to one or more retailer computing systems 120 about this identification (e.g., in addition to out-of-stock predictions). A strong signal for an "irreplaceable item" is if a user would not accept any replacement for this particular item. For example, the user may communicate to a picker, "Either get me this thing, or get me a different size of the same thing, but no replacements please." This particular signal would be very useful for retailers in order to try keeping certain "irreplaceable item" always in stock. Alternatively or additionally, the action application module 270 may trigger the content presentation module 210 to adapt a user interface of a replacement page at the user client device 100 depending on the irreplaceability score and/or the brand stickiness score. For example, if the item had a high irreplaceability score, the content presentation module 210 may adapt the user interface to suggest refunding the item first rather than offering a replacement.

As each user of the online concierge system 140 have certain preferences, as identified by brand stickiness scores output by the metric prediction model, the action application module 270 may trigger reduction of a size of an online catalog of items (e.g., stored at the data store 240). The size of the online catalog of items may be reduced by removing a set of items that are identified as not being user's preference, based on their brand stickiness scores below a threshold score. It should be noted that the metric prediction model identifies which sets of items are equivalent, e.g., because their irreplaceability scores are low and these items are commonly replaced with one another without user complaint. Hence, by considering irreplaceability scores below a threshold score for the sets of items, the action application module 270 may trigger minimizing the size of the online catalog of items to decrease the number of choices for users to make while keeping solid coverage of all types of items. This can be useful as less decision paralysis often proves to be beneficial.

Alternatively or additionally, by considering irreplaceability scores below a threshold score for the sets of items, the action application module 270 may trigger minimizing a size of a catalog of items stored at the retailer computing system 120, either automatically or upon a request from a retailer associated with the online concierge system 140. It should be noted that there may be some users who do want the breadth of options (as they may like to explore different brands or try new items). The action application module 270 may deduce those users and selectively turn the size reduction of the online catalog of items based on user satisfaction/gross merchandise value (GMV) lift for certain segments of users.

In one or more embodiments, based on irreplaceability scores and/or brand stickiness scores for a set of items as output by the metric prediction model, the action application module 270 generates a recommendation for a retailer associated with the online concierge system 140 about a shelf layout at a retailer's store. The action application module 270 may communicate the recommendation to the retailer computing system 120 via the network 130. Based on the received recommendation, the retailer can make more intelligent choices about laying out items on shelves. For example, for user convenience, items that are commonly replaced with each other can be placed next to each other.

Hence, for sets of items that are more equivalent (e.g., have lower irreplaceability scores), the retailer can devise a store layout that makes sure users find all similar items at the same physical space, which allows for a more pleasurable shopping experience. Additionally, if two items that are frequently replaced with each other are placed on a shelf side by side, fulfillments conducted by pickers would be sped up, which potentially increases GMV for this particular store.

Additionally or alternatively, the recommendation provided from the action application module 270 to the retailer computing system 120 may include a suggestion for the retailer to omit a certain set of items altogether from the retailer's store (e.g., due to their low irreplaceability scores). This may open up space at the retailer's store for other items that the retailer does not carry at the moment. Additionally or alternatively, the recommendation provided from the action application module 270 to the retailer computing system 120 may include a suggestion for the retailer to prominently display a specific brand. For example, if a brand stickiness score for an item is high enough indicating that a brand is sticky, the action application module 270 may generate the recommendation for the retailer to display the brand prominently or potentially display a varietal.

In one or more embodiments, based on brand stickiness scores for a set of items as output by the metric prediction model, the action application module 270 generates insights data for a consumer-packaged goods (CPG) brand manufacturer associated with the online concierge system 140. The action application module 270 may generate insights about various brands, branded items and how to market these brands and branded items. As the typical CPG brand manufacturer does a lot of market research to understand their competitors and comparables for their items in a particular line, the insights data with information brand stickiness for various brands and branded items would be beneficial for the CPG brand manufacturer as the insights data represent hard data as to what their key item competitors are. For example, the insights data received from the online concierge system 140 may allow the CPG brand manufacturer to understand for which items their brand is not resonating (perhaps they have recently dived into a new item line or area, and they have not yet developed brand recognition), and also give them opportunities to highlight their brand's differentiation from competitors.

In one or more embodiments, based on irreplaceability scores and/or brand stickiness scores for a set of items as output by the metric prediction model, the action application module 270 triggers issuance of discount coupons and offers for users to convert certain items. The action application module 270 may trigger issuance of a discount coupon for conversion of a suggested replacement item in order to further encourage the user to accept the suggested replacement item (e.g., when an irreplaceability score for a missing item is relatively high). Additionally or alternatively, the action application module 270 may recommend a CPG brand manufacturer to issue discount coupons for certain CPG brands in order to entice users away from other equivalent items from other brands to their own brands. In this manner, the CPG brand manufacturer could offer discount coupons to avoid being replaced by competitors. For example, if the user is searching for Brand A 32 oz 2% plain yogurt, the action application module 270 may enable a Brand B CPG brand manufacturer to dynamically offer a discount coupon to their own 32 oz 2% plain yogurt to entice users to add theirs instead.

In one or more embodiments, based on irreplaceability scores and/or brand stickiness scores for a set of items as output by the metric prediction model, the action application module 270 changes attributes prices for the set of items in a catalog of items stored at the online concierge system 140 (e.g., at the data store 240). Alternatively, the action application module 270 may send, via the network 130, recommendations to the retailer computing system 120 about features for the set of items in a catalog of items maintained by a retailer at the retailer computing system 120. Alternatively or additionally, the action application module 270 may provide recommendations to a CPG brand manufacturer about features for the set of items in a catalog of items maintained by the CPG brand manufacturer.

In one or more embodiments, based on irreplaceability scores and/or brand stickiness scores for a set of items as output by the metric prediction model, the action application module 270 generates a recommendation for a retailer associated with the online concierge system 140 about an inventory and ordering of items. The action application module 270 may communicate the recommendation to the retailer computing system 120 via the network 130. In communicating the recommendation, the action application module 270 may provide information to the retailer about what items need to be ordered and what quantities of items need to be ordered. In communicating the recommendation, the action application module 270 may further provide, based on the brand stickiness scores and genericity of items, information on whether the retailer can shift an inventory to where they can maximize profitable GMV (e.g., when two items in question have different costs for a retailer).

The machine-learning training module 230 may perform initial training of the metric prediction model using training data. The machine-learning training module 230 may generate the training data by collecting explicit item replacement data for a group of users and scraping user comments (e.g., from user-picker chat). The machine-learning training module 230 may obtain these feedback ground truth data by retrieving replacement history data from the data store and/or by receiving the explicit item replacement data from user client devices 100. For example, if a user refuses to replace an ordered item with another item, the machine-learning training module 230 may determine why (or the reason can be manually curated) according to a set of rules. If the candidate replacement was a different brand, then the issue is "brand stickiness." If brand is not an issue, but the item is slightly different, then the issue is "irreplaceability" of the item. Additionally, the intent from the user's comments or feedback can be extracted. The machine-learning training module 230 may train the metric prediction model using the training data to generate an initial set of parameters of the metric prediction model.

Furthermore, the machine-learning training module 230 may collect feedback data with information about a user's response in relation to a replacement item suggested to the user based on metrics output by the metric prediction model. The feedback data may further include information about conversion of items upon a retailer associated with the online concierge system 140 performs one or more actions as recommended by the action application module 270. The machine-learning training module 230 may re-train the metric prediction model by updating the set of parameters of the metric prediction model using the collected feedback data.

Figure 4:
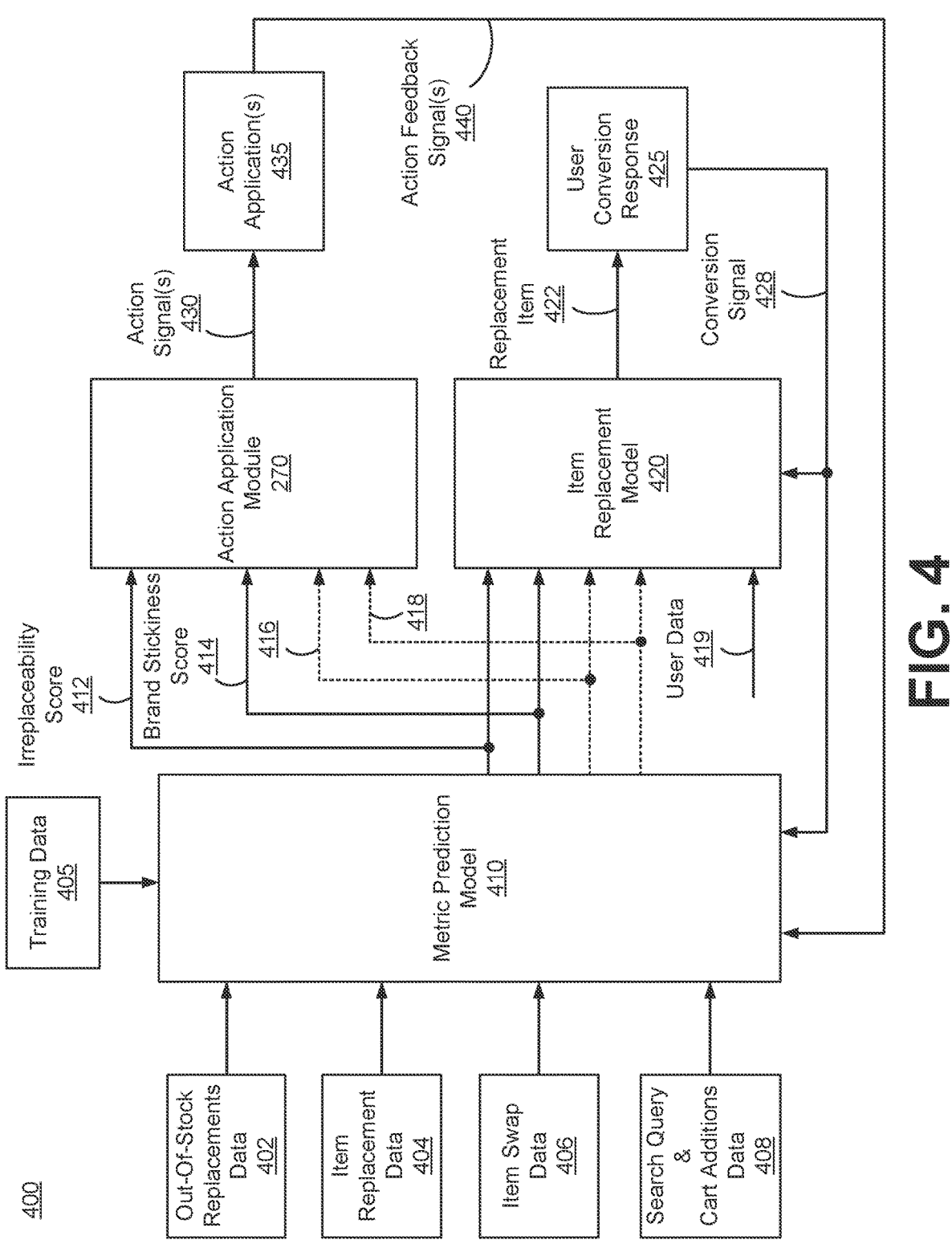
FIG. 4 illustrates an example architectural flow diagram of using a trained model to generate action recommendations by predicting different metrics related to items ordered at an online concierge system, in accordance with one or more embodiments.

FIG. 4 illustrates an example architectural flow diagram 400 of using a metric prediction model 410 to determine different metrics (i.e., features) of an item ordered by a user of the online concierge system 140, in accordance with one or more embodiments. First, the online concierge system 140 may perform (e.g., via the machine-learning training module 230) initial training of the metric prediction model 410 using training data 405 to generate an initial set of parameters of the metric prediction model 410. The training data 405 may be generated (e.g., via the machine-learning training module 230) by collecting explicit item replacement data (i.e., ground truth item replacement data) for a group of users of the online concierge system 140. After the training process is completed, the online concierge system 140 may provide various inputs to the metric prediction model 410 (e.g., via the metric prediction module 250), such as out-of-stock replacements data 402, item replacement data 404, item swap data 406, and/or search query and cart additions data 408. Some additional input features not shown in FIG. 4 suitable for evaluating different features of the item may be further provided to the metric prediction model 410.

In providing the out-of-stock data 402 to the metric prediction model 410, the online concierge system 140 may provide (e.g., via the metric prediction module 250) data with information about a requested out-of-stock item and information about a replacement (if any) that the user performed while shopping online. The online concierge system 140 may receive the out-of-stock data 402 from the user client device 100 via the network 130. In providing the item replacement data 404 to the metric prediction model 410, the online concierge system 140 may provide (e.g., via the metric prediction module 250) data with information about purchasing history for the user, including information about item replacements performed by the user over a defined time period (e.g., two weeks, month, six months, etc.). The metric prediction module 250 may retrieve the item replacement data 404 from the data store 240.

In providing the item swap data 406 to the metric prediction model 410, the online concierge system 140 may provide (e.g., via the metric prediction module 250) data with information about the user swapping items when using the smart shopping cart 150 (e.g., placing items in and out of the smart shopping cart 150). The item swap data 406 may be gathered via cameras and other sensors of the smart shopping cart 150 and provided via the network 130 to the online concierge system 140 and the metric prediction module 250. In providing the search query and cart additions data 408 to the metric prediction model 410, the online concierge system 140 may provide (e.g., via the metric prediction module 250) data with information about a search query for an item entered by the user via a user interface of the user client device 100 that is followed by adding a different item into a user's cart. The item added to the user's cart may be of the same type or of different type compared to that of the item searched in the search query. Alternatively or additionally, the item added to the user's cart may be of the same brand or of different brand compared to that of the item searched in the search query. The online concierge system 140 may receive the search query and cart additions data 408 from the user client device 100 via the network 130.

The metric prediction model 410 may apply a machine-learning algorithm to the out-of-stock data 402, the item replacement data 404, the item swap data 406, and/or the search query and cart additions data 408 to output different metrics (e.g., features) for the item ordered by the user. In particular, the metric prediction model 410 may output an irreplaceability score 412 that is indicative of an irreplaceability feature of the item and a brand stickiness score 414 that is indicative of a brand stickiness feature of the item. Furthermore, the metric prediction model 410 may also output a genericity score 416 that is indicative of a genericity feature of the item, i.e., of whether the item is generic or not.

Additionally or alternatively, the metric prediction model 410 may further output a swapability score 418 indicative of a swapability feature of the item, i.e., of how often a particular item is swapped with another item using either in-store list feature of the user client device 100 or using the smart shopping cart 150 at a location of a retailer. The irreplaceability score 412, the brand stickiness score 414, and optionally the genericity score 416 and/or the swapability score 418 output by the metric prediction model 410 may be passed to the item replacement model 420 and/or the action application module 270.

The item replacement model 420 may run a machine-learning algorithm to user data 419 as well as the irreplaceability score 412, the brand stickiness score 414, the genericity score 416 and/or the swapability score 418 to generate a list of one or more candidate items for replacing the item originally requested by the user. The user data 419 may include contextual data about the user, as well as information about a replacement history associated with the user. The user data 419 may be retrieved by, e.g., the item replacement module 260 from the data store 240. Based on the list of one or more candidate items, the item replacement model 420 may identify a replacement item 422 that would be surfaced to the user (e.g., via a user interface of the user client device 100). Due to additional input features output by the metric prediction model 410 and provided to the item replacement model 420, output results of the item replacement model 420 should be improved compared to output results if the additional input features were not provided to the item replacement model 420.

A user conversion response 425 in relation to the suggested replacement item 422 may be recorded and fed back as a conversion signal 428 to the metric prediction model 410 and/or the item replacement model 420. For example, the binary value of "0" for the conversion signal 428 may indicate that the user did not convert the suggested replacement item 422, and the binary value of "1" for the conversion signal 428 may indicate that the user converted the suggested replacement item 422. The online concierge system 140 may utilize (e.g., via the machine-learning training module 230) the conversion signal 428 to re-train the metric prediction model 410 and/or the item replacement model 420. By utilizing the conversion signal 428, the machine-learning training module 230 may improve the set of parameters of the metric prediction model 410 and/or the set of parameters of the item replacement model 420 in order to continuously improve a metric prediction machine-learning algorithm of the metric prediction model 410 and/or an item replacement machine-learning algorithm of the item replacement model 420.

The action application module 270 may generate, based on the irreplaceability score 412, the brand stickiness score 414, the genericity score 416 and/or the swapability score 418, one or more action signals 430 that trigger one or more actions, such as reducing a size of an online catalog of items (e.g., at the online concierge system 140 and/or the retailer computing system 120), generating various retailer insights (e.g., recommendations about inventory, ordering of items, placing items at store shelves, etc.), generating recommendations for CPG brand manufacturers on how to market their brands, generating discount coupons or recommending different discount offers to retailers, some other action, or some combination thereof. The one or more actions triggered by the one or more action signals 430 may be cumulatively performed as action application(s) 435.

The action application(s) 435 may generate one or more action feedback signals 440 indicative of results of the applied actions. For example, the one or more action feedback signals 440 may include information about conversion by the user when a discount coupon is offered to the user, information about how users responded to marketing of CPG brands, information about any changes in terms of GMV when a retailer applies the recommended in-store shelf layout, information about any changes in terms of GMV when a retailer applies the recommended inventory changes, etc. The online concierge system 140 may utilize (e.g., via the machine-learning training module 230) the one or more action feedback signals 440 to re-train the metric prediction model 410. By utilizing the one or more action feedback signals 440, the machine-learning training module 230 may improve the set of parameters of the metric prediction model 410 in order to continuously improve the metric prediction machine-learning algorithm of the metric prediction model 410.

Figure 5:
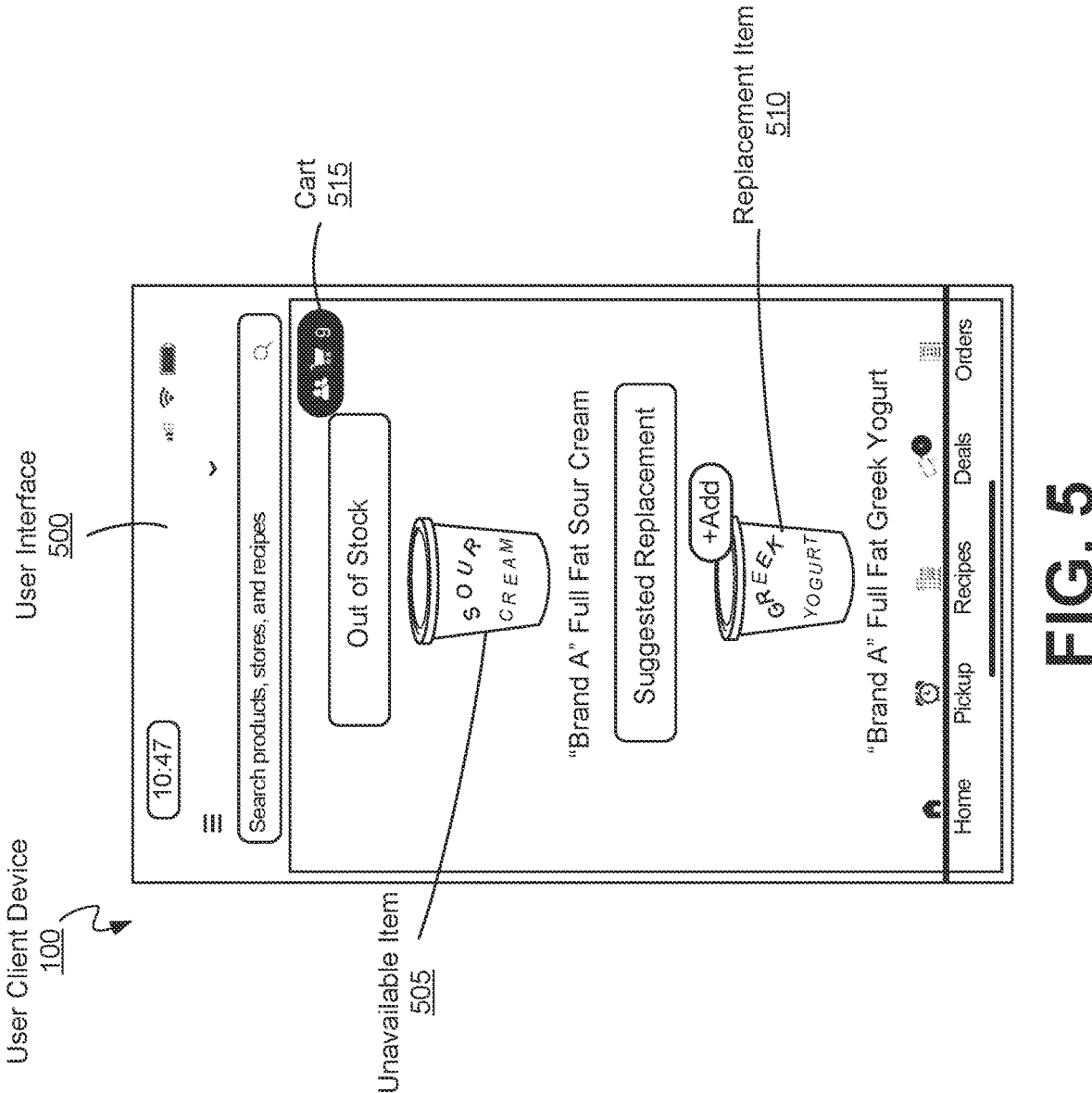
FIG. 5 illustrates an example user interface of a device associated with a user of an online concierge system that displays a suggested replacement item for the user based on metrics predicted by a trained model, in accordance with one or more embodiments.

FIG. 5 illustrates an example user interface 500 of the user client device 100 that displays a suggested replacement item for the user based on metrics predicted by a metric prediction model, in accordance with one or more embodiments. The user interface 500 may be displayed during an ordering session of a user who requested an unavailable item 505 (i.e., an out-of-stock item, such as "Brand A Full Fat Sour Cream"). The metric prediction model may predict (e.g., either during the current ordering session or before the ordering session) an irreplaceability score and a brand stickiness score for the unavailable item 505. For example, the irreplaceability score is below a first threshold score indicating that the unavailable item 505 is replaceable for this specific user. However, the brand stickiness score for the unavailable item 505 is above a second threshold score indicating that a brand (e.g., Brand A) of the unavailable item 505 is of a high stickiness for this specific user. An item replacement algorithm of the online concierge system 140 (e.g., run by the item prediction model) may use the irreplaceability score and the brand stickiness score (along with user data) to identify a replacement item 510 for suggestion to the user. The content presentation module 210 causes the user client device 100 to display the user interface 500 with the replacement item 510.

As the irreplaceability score for the unavailable item 505 is relatively low and the brand stickiness score for the unavailable item 505 is relatively high, the replacement item 510 is identified that is of different type than that of the unavailable item 505 but of the same brand than that of the unavailable item 505. For example, the replacement item 510 is "Brand A Full Fat Greek Yogurt". The user may utilize the user interface 500 to add the suggested replacement item 510 into a cart 515. Although FIG. 5 shows the user interface 500 with only one suggested replacement item, the user interface 500 may display one or more additional replacement items for suggestion to the user. A signal generated based on whether or not the user converted the suggested replacement item 510 may be then utilized (e.g., via the machine-learning training model 230) to re-train the metric prediction model and/or the item replacement model.

FIG. 6 is a flowchart for a method of using a trained model to generate action recommendations by predicting different metrics related to items ordered at an online concierge system, in accordance with one or more embodiments. Alternative embodiments may include more, fewer, or different steps from those illustrated in FIG. 6, and the steps may be performed in a different order from that illustrated in FIG. 6. These steps may be performed by an online concierge system (e.g., the online concierge system 140). Additionally, each of these steps may be performed automatically by the online concierge system without human intervention.

The online concierge system 140 gathers 605 (e.g., at the metric prediction module 250) replacement data related to replacement of an item either via a user interface at a device associated with a user of the online concierge system 140 (e.g., the user client device 100) or at a location of a retailer associated with the online concierge system 140 when the user uses a physical receptacle (e.g., the smart shopping cart 150) in communication with the online concierge system 140. The online concierge system 140 may gather the replacement data by receiving (e.g., at the metric prediction module 250), from the device associated with the user via a network, data with information about replacing via the user interface the item originally requested by the user with another item, the received data including a set of features of the item and the other item. Alternatively, the online concierge system 140 may gather the replacement data by receiving (e.g., at the metric prediction module 250), from the device associated with the user via the network, data with information about a search query entered by the user at the user interface in relation to the item followed by adding another item in the cart, the received data including a set of features of the item and the other item.

Alternatively, the online concierge system 140 may gather the replacement data using one or more sensors mounted to the physical receptacle when the user is at the location of the retailer and replaces the item with another item using the physical receptacle, the replacement data including a set of features of the item and the other item. Alternatively or additionally, the online concierge system 140 may gather the replacement data using one or more sensors mounted to the physical receptacle when the user is at the location of the retailer and adds another item to the physical receptacle as the item is out-of-stock at the location of the retailer, the replacement data including a set of features of the item and the other item.

The online concierge system 140 accesses 610 a metric prediction model of the online concierge system 140 (e.g., via the metric prediction module 250), wherein the metric prediction model is trained to predict at least one of an irreplaceability feature for the item or a brand stickiness feature for the item. The online concierge system 140 applies 615 the metric prediction model (e.g., via the metric prediction module 250) to predict, based on the replacement data, at least one of an irreplaceability score for the item indicative of the irreplaceability feature or a brand stickiness score for the item indicative of the brand stickiness feature.

The online concierge system 140 accesses 620 an item replacement model of the online concierge system 140 (e.g., via the item replacement module 260), wherein the item replacement model is trained to identify a list of one or more candidate replacement items for replacing the item. The online concierge system 140 applies 625 the item replacement model (e.g., via the item replacement module 260) to identify, based in part on at least one of the irreplaceability score or the brand stickiness score, the list of one or more candidate replacement items. The online concierge system 140 causes 630 (e.g., via the content presentation module 210) the device associated with the user to display the user interface with a replacement item from the list prompting the user to include the replacement item to a cart.

In one or more embodiments, the online concierge system 140 triggers (e.g., via the action application module 270), based on at least one of the irreplaceability score or the brand stickiness score, reduction of a size of a catalog of items stored at the online concierge system 140 (e.g., at the data store 240) by removing a set of one or more items from the catalog that are associated with the item. Alternatively or additionally, the online concierge system 140 may generate (e.g., via the action application module 270), based on at least one of the irreplaceability score or the brand stickiness score, a recommendation for a retailer associated with the online concierge system 140 about a layout of a set of items on shelves at a location of the retailer. The online concierge system 140 may communicate (e.g., via the action application module 270) the recommendation to a computing system of the retailer (e.g., the retailer computing system 120) via a network (e.g., the network 130).

In one or more embodiments, the online concierge system 140 triggers (e.g., via the action application module 270), based on at least one of the irreplaceability score or the brand stickiness score, issuance of a discount coupon for conversion of the replacement item. The online concierge system 140 may cause (e.g., via the content presentation module 210) the device associated with the user to display the user interface further with the discount coupon prompting the user to convert the replacement item using the discount coupon.

In or more embodiments, the online concierge system 140 generates (e.g., via the machine-learning training module 230) training data by collecting information about a replacement of a first set of items with a second set of items by a group of users of the online concierge system 140 and feedback provided by the group of users in relation to the replacement. The online concierge system 140 may train (e.g., via the machine-learning training module 230) the metric prediction model using the training data to generate an initial set of parameters of the metric prediction model. The online concierge system 140 may collect (e.g., via the machine-learning training module 230) feedback data with information about a response by the user in relation to the replacement item suggested to the user. The online concierge system 140 may re-train (e.g., via the machine-learning training module 230) the metric prediction model and the item replacement model by updating, using the collected feedback data, the set of parameters of the metric prediction model and the set of parameters of the item replacement model.

Embodiments of the present disclosure are directed to the online concierge system 140 that uses a model trained to predict different metrics for an item, where the model takes explicit and implicit item replacements as inputs. The model is trained using explicit item replacements as ground truth. Based on the metrics predicted by the trained model, various recommendations can be triggered for performing actions at the online concierge system 140 as well as for performing actions by retailers associated with the online concierge system 140.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   operating one or more weight sensors, one or more cameras and a computer vision of a smart shopping cart that is integrated into the computer system and is in communication with the computer system to gather replacement data with information about an item and a different item, wherein the replacement data is gathered via the one or more weight sensors, the one or more cameras and the computer vision when a user of the computer system uses the smart shopping cart at a location of a retailer during a current session of the user and replaces the item that was initially placed in the smart shopping cart with the different item that is currently placed in the smart shopping cart, and wherein the replacement data gathered via the one or more weight sensors, the one or more cameras and the computer vision includes information that the item and the different item are of a same type, information that the different item is placed in the smart shopping cart at a time after a removal of the item from the smart shopping cart, and information that content of the smart shopping cart was not changed after the removal of the item and before a placement of the different item in the smart shopping cart;

uploading, from the smart shopping cart and via a network, the replacement data;

responsive to uploading the replacement data, accessing a metric prediction model, wherein the metric prediction model is a machine-learning model trained to predict at least one of an irreplaceability feature for the item or a brand stickiness feature for the item;

applying the metric prediction model to the replacement data to generate at least one of an irreplaceability score for the item indicative of the irreplaceability feature or a brand stickiness score for the item indicative of the brand stickiness feature;

accessing an item replacement model, wherein the item replacement model is a machine-learning model trained to identify a list of one or more candidate replacement items for replacing the item;

applying the item replacement model to at least one of the irreplaceability score or the brand stickiness score to generate the list of one or more candidate replacement items; and causing the smart shopping cart to display a user interface with information about a replacement item selected from the list prompting the user to place the replacement item in the smart shopping cart during the current session of the user.

2. The method of claim 1, wherein uploading the replacement data comprises:
   receiving, from the smart shopping cart and via the network, the replacement data including a set of features of the item and the different item.

3. The method of claim 1, wherein uploading the replacement data comprises:
   receiving, from the smart shopping cart and via the network, the replacement data with information about a search query entered by the user at the user interface in relation to the item followed by adding the different item in the smart shopping cart, the replacement data including a set of features of the item and the different item.

4. The method of claim 1, wherein gathering the replacement data comprises:
   gathering the replacement data including a set of features of the item and the different item.

5. The method of claim 1, further comprising:

reducing, based on at least one of the irreplaceability score or the brand stickiness score, a size of a catalog of items stored at the computer system by removing a set of one or more items from the catalog that are associated with the item.

6. The method of claim 1, further comprising:

generating, based on at least one of the irreplaceability score or the brand stickiness score, a recommendation for a retailer associated with the computer system about a layout of a set of items on shelves at a location of the retailer; and communicating the recommendation to a computing system of the retailer via the network.

7. The method of claim 1, further comprising:

triggering, based on at least one of the irreplaceability score or the brand stickiness score, issuance of a discount coupon for conversion of the replacement item; and causing the smart shopping cart to display the user interface further with the discount coupon prompting the user to convert the replacement item using the discount coupon.

8. The method of claim 1, further comprising:

generating training data by collecting information about a replacement of a first set of items with a second set of items by a group of users of the computer system and feedback provided by the group of users in relation to the replacement; and training the metric prediction model using the training data to generate an initial set of parameters of the metric prediction model.

9. The method of claim 1, further comprising:

collecting feedback data with information about a response by the user in relation to the replacement item suggested to the user; and re-training the metric prediction model and the item replacement model by updating, using the collected feedback data, a set of parameters of the metric prediction model and a set of parameters of the item replacement model.

10. A computer program product comprising a non-transitory computer readable storage medium having instructions encoded thereon that, when executed by a processor, cause the processor to perform steps comprising:

operating one or more weight sensors, one or more cameras and a computer vision of a smart shopping cart that is integrated into a computer system and is in communication with the computer system to gather replacement data with information about an item and a different item, wherein the replacement data is gathered via the one or more weight sensors, the one or more cameras and the computer vision when a user of the computer system uses the smart shopping cart at a location of a retailer during a current session of the user and replaces the item that was initially placed in the smart shopping cart with the different item that is currently placed in the smart shopping cart, and wherein the replacement data gathered via the one or more weight sensors, the one or more cameras and the computer vision includes information that the item and the different item are of a same type, information that the different item is placed in the smart shopping cart at a time after a removal of the item from the smart shopping cart, and information that content of the smart shopping cart was not changed after the removal of the item and before a placement of the different item in the smart shopping cart;

uploading, from the smart shopping cart and via a network, the replacement data;

responsive to uploading the replacement data, accessing a metric prediction model, wherein the metric prediction model is a machine-learning model trained to predict at least one of an irreplaceability feature for the item or a brand stickiness feature for the item;

applying the metric prediction model to the replacement data to generate at least one of an irreplaceability score for the item indicative of the irreplaceability feature or a brand stickiness score for the item indicative of the brand stickiness feature;

accessing an item replacement model, wherein the item replacement model is a machine-learning model trained to identify a list of one or more candidate replacement items for replacing the item;

applying the item replacement model to at least one of the irreplaceability score or the brand stickiness score to generate the list of one or more candidate replacement items; and causing the smart shopping cart to display a user interface with information about a replacement item selected from the list prompting the user to place the replacement item in the smart shopping cart during the current session of the user.

11. The computer program product of claim 10, wherein the instructions further cause the processor to perform steps comprising:

uploading the replacement data by receiving, from the smart shopping cart and via the network, the replacement data including a set of features of the item and the different item.

12. The computer program product of claim 10, wherein the instructions further cause the processor to perform steps comprising:

uploading the replacement data by receiving, from the smart shopping cart and via the network, the replacement data with information about a search query entered by the user at the user interface in relation to the item followed by adding the different item in the smart shopping cart, the replacement data including a set of features of the item and the different item.

13. The computer program product of claim 10, wherein the instructions further cause the processor to perform steps comprising:

gathering the replacement data including a set of features of the item and the different item.

14. The computer program product of claim 10, wherein the instructions further cause the processor to perform steps comprising:

reducing, based on at least one of the irreplaceability score or the brand stickiness score, a size of a catalog of items stored at the computer system by removing a set of one or more items from the catalog that are associated with the item.

15. The computer program product of claim 10, wherein the instructions further cause the processor to perform steps comprising:

triggering, based on at least one of the irreplaceability score or the brand stickiness score, issuance of a discount coupon for conversion of the replacement item; and causing the smart shopping cart to display the user interface further with the discount coupon prompting the user to convert the replacement item using the discount coupon.

16. The computer program product of claim 10, wherein the instructions further cause the processor to perform steps comprising:

generating training data by collecting information about a replacement of a first set of items with a second set of items by a group of users of the computer system and feedback provided by the group of users in relation to the replacement;

training the metric prediction model using the training data to generate an initial set of parameters of the metric prediction model;

collecting feedback data with information about a response by the user in relation to the replacement item suggested to the user; and re-training the metric prediction model and the item replacement model by updating, using the collected feedback data, a set of parameters of the metric prediction model and a set of parameters of the item replacement model.

17. A computer system comprising:

a processor; and a non-transitory computer-readable storage medium having instructions that, when executed by the processor, cause the computer system to perform steps comprising:

operating one or more weight sensors, one or more cameras and a computer vision of a smart shopping cart that is integrated into the computer system and is in communication with the computer system to gather replacement data with information about an item and a different item, wherein the replacement data is gathered via the one or more weight sensors, the one or more cameras and the computer vision when a user of the computer system uses the smart shopping cart at a location of a retailer during a current session of the user and replaces the item that was initially placed in the smart shopping cart with the different item that is currently placed in the smart shopping cart, and wherein the replacement data gathered via the one or more weight sensors, the one or more cameras and the computer vision includes information that the item and the different item are of a same type, information that the different item is placed in the smart shopping cart at a time after a removal of the item from the smart shopping cart, and information that content of the smart shopping cart was not changed after the removal of the item and before a placement of the different item in the smart shopping cart;

uploading, from the smart shopping cart and via a network, the replacement data;

responsive to uploading the replacement data, accessing a metric prediction model, wherein the metric prediction model is a machine-learning model trained to predict at least one of an irreplaceability feature for the item or a brand stickiness feature for the item;

applying the metric prediction model to the replacement data to generate at least one of an irreplaceability score for the item indicative of the irreplaceability feature or a brand stickiness score for the item indicative of the brand stickiness feature;

accessing an item replacement model, wherein the item replacement model is a machine-learning model trained to identify a list of one or more candidate replacement items for replacing the item;

applying the item replacement model to at least one of the irreplaceability score or the brand stickiness score to generate the list of one or more candidate replacement items; and causing the smart shopping cart to display a user interface with information about a replacement item selected from the list prompting the user to place the replacement item in the smart shopping cart during the current session of the user.

* * * * *